A. C. LYLES.
SAFETY STEERING MECHANISM FOR AUTOMOBILES.
APPLICATION FILED NOV. 8, 1915.
1,176,227.  Patented Mar. 21, 1916.
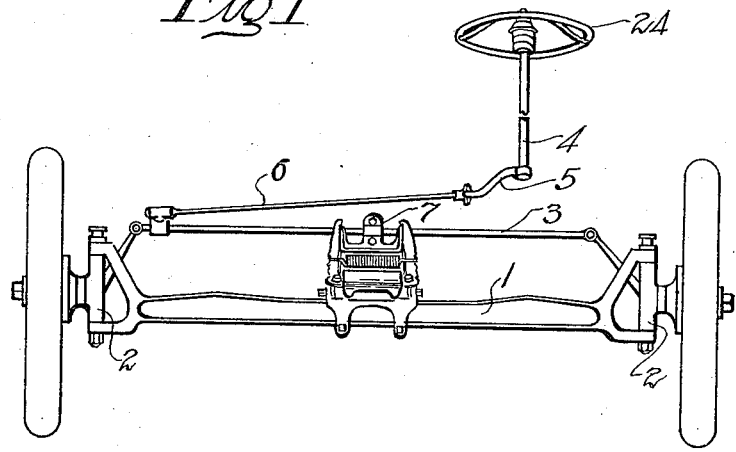
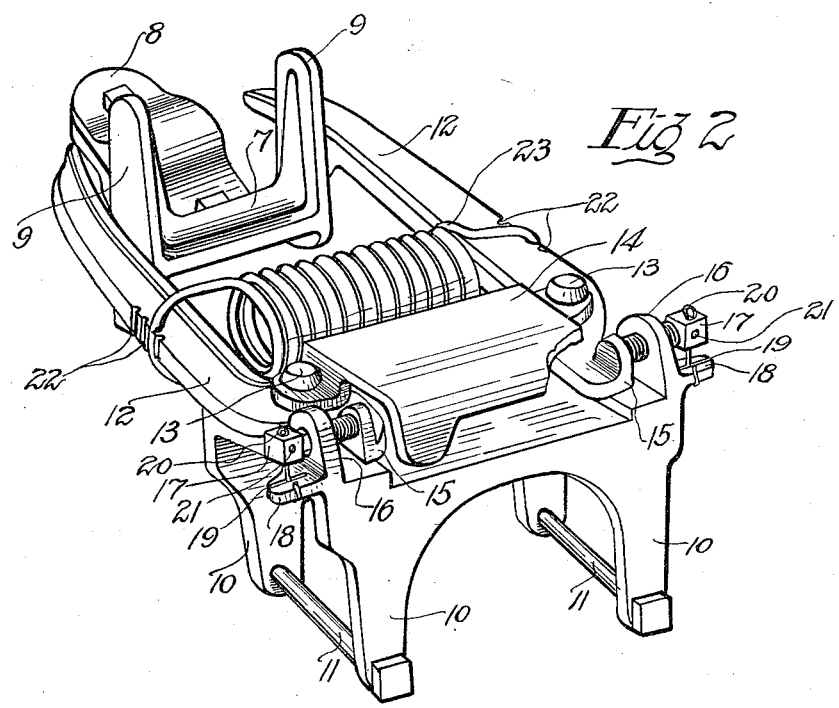
Witness
J. Gordon Sparkes
Inventor
Andrew C. Lyles
By R. D. Johnston
Attorney

UNITED STATES PATENT OFFICE.

ANDREW C. LYLES, OF DALLAS, TEXAS.

SAFETY STEERING MECHANISM FOR AUTOMOBILES.

1,176,227.  Specification of Letters Patent.  Patented Mar. 21, 1916.

Application filed November 8, 1915. Serial No. 60,420.

*To all whom it may concern:*

Be it known that I, ANDREW C. LYLES, a citizen of the United States of America, residing at Dallas, in the county of Dallas and State of Texas, have invented certain new and useful Improvements in Safety Steering Mechanism for Automobiles, of which the following is a specification.

My invention relates to a safety steering mechanism which is adapted to make safer and easier the steering of automobiles and which is particularly applicable to cars having steering gears which are actuated by cranks on the steering post, such as Ford cars, wherein the lateral thrusts and strains on the wheels from the bumps, ruts and irregularities of the roadway are imparted directly to the steering wheel.

One object of my invention is to adapt the steering mechanism to utilize a single spring for controlling two pivoted levers which work in opposite directions to hold the steering rod in central position so that the car will travel in a straight line.

A further object is to improve the means for effecting an adjustment of this spring so as to enable it to counteract any initial tendency in the steering mechanism to cause the car to run toward one side or the other.

A further feature of my invention relates to the provision of simple means for varying the tension of the spring to suit the road conditions and of means for preventing any possibility of the adjustments on the levers working loose.

My invention further comprises the novel details of construction and arrangements of parts which are hereinafter more particularly described, reference being had to the accompanying drawings which form a part of this specification, and in which:—

Figure 1 shows my invention applied to a forward axle of a Ford car. Fig. 2 is an enlarged detail view in perspective of the apparatus attached.

Similar reference numerals refer to similar parts throughout the drawings.

As illustrated, I have shown my invention in connection with a car having a forward axle 1, steering knuckles 2, the cranks of which are connected by the steering rod 3. A steering post 4 is connected by a crank 5 and link 6 to the rod 3 and serves to directly guide the steering knuckles and to receive the shocks imparted to the wheels in running. In order to minimize these shocks and to yieldingly hold the car to a straight line of travel, I provide on the rod 3 a bracket 7 held fast on the rod 3 by a clamp 8 and having at each side upturned lugs 9. The detail construction of this bracket forms no part of my present invention and no claims therefor are presented in this case. On the axle is mounted a bracket frame formed as a casting having pairs of arms 10 which straddle the axle and are cross connected below it by the bolts 11. Two lever arms 12 are pivotally mounted near each end of the axle bracket by means of bolts or rivets 13 which pass through each end of a cross brace plate 14 and then through an intermediate point in the lever arms and through the top of the bracket to which they are suitably made fast. By this arrangement the arms are free to have a limited swing horizontally. These horizontal movements are limited by providing a rear lug extension 15 on each lever arm behind its pivot and providing an upturned lug 16 at each end of the axle bracket to the outside of the lugs 15 and through each of which a set screw 17 is threaded and adapted to engage the lug 15 on the adjacent lever arm. A horizontal flange 18 extends under the outer ends of the set screws and is provided with a longitudinal slot or groove 19 which receives a vertical cotter pin or key 20 that is passed down through one of the several transverse holes 21 provided for it through the head of each set screw.

On the outside edges of the forward intermediate portions of the lever arms 12 are provided a series of notches 22 which are adapted to receive the looped ends of a coiled spring 23 and hold it in adjusted position between the arms. The outer ends of the arms are flanged to increase their bearing faces which receive between them and bear against the outer faces of the lugs 9 on the steering rod bracket 7.

In operation, bearing in mind that the bracket casting carrying the levers 12 remains stationary on the axle, as the steersman turns the steering wheel 24 one way or the other, the steering rod 3 travels to the right or left, carrying with it the bracket 7. The lugs of this bracket alternately push out one or the other of the spring pressed lever arms 12, depending upon which way the steering rod is moved. If the steering rod is pulled to the right, the right hand lever 12 is pushed out by the right hand lug 9 while the left hand lever is held in a straight or normal position because its lug 15 will engage its set screw 17 and prevent it from following the swing of the right hand arm 12. It thus forms a fixed bearing for the left hand end of the spring which is put under tension by the movement of the right hand lever and the farther the steering rod is moved to the right, the greater the tension on the spring 23. As soon as the pull on the rod 3 is released the spring will pull it and the wheels back to straight or normal running position, as shown in Fig. 1. As the steering rod is moved to the left, the right hand lever forms a fixed bearing for the spring and the left hand lever in opening out, expands the spring which will draw the rod 3 back to initial position as soon as the pull on it is released. Inasmuch as only one spring is used, it follows that the pressure thereof will work uniformly both ways. The set screws 17 can be adjusted to shift either one of the lever arms to put a tension on the spring so that the device can be made to pull to the right or left as desired, thus overcoming any natural tendency of the car to go to the left or right. Also the farther the spring is adjusted outwardly in the notches 22, the greater the tension and as the greater tension is needed for rougher roads, the device is capable of prompt adjustment to suit the normal conditions of service for the car.

The special advantage of disposing the spring between the axle and steering rod and near the pivoted ends of the lever arms is that I am enabled to use a short and stiff spring which will not tend to shake or rattle.

What I claim as new and desire to secure by Letters Patent, is:—

1. In a safety steering device, the combination with a vehicle axle and a connecting rod for the steering wheels, of a frame fast on the axle, two arms pivoted near their rear ends to said frame and disposed to swing in a horizontal plane, stops on said frame outside of the rear ends of the arms and adapted to engage said ends and permit the arms to swing only in opposite directions, a coiled spring having its ends engaged over intermediate portions of said arms, means to adjust said spring along said arms, and a member fast on the connecting rod and interposed between the outer ends of said arms and in engagement therewith, substantially as described.

2. In a safety steering device, the combination with a vehicle axle and a connecting rod for the steering wheels, of a frame fast on the axle, a pair of horizontally swinging arms pivoted near their rear ends to said frame, set screws disposed to the outside of said arms and adapted to engage their rear ends, a plurality of notches on the outer edges of the forward portions of said arms, a coiled spring having its ends engaged in any desired pair of said notches and adapted to draw the arms together and against their stops, and a clamp member fast on the connecting rod and interposed between the forward ends of said arms, substantially as described.

3. In a safety steering device, the combination with a vehicle axle and a connecting rod for the steering wheels, of a frame fast on the axle, a pair of horizontally swinging arms pivoted near their rear ends to said frame, set screws disposed to the outside of said arms and adapted to engage their rear ends, lugs on said frame disposed alongside said set screws and having slots parallel with said screws, cotter keys passed through the set screw heads and through said slots to lock the set screws, a spring holding the forward ends of said arms together, and a fixed part on the connecting rod disposed between said arms.

In testimony whereof I affix my signature.

ANDREW C. LYLES.

Witness:
NOMIE WELSH.